United States Patent
Buckwalter et al.

(10) Patent No.: US 8,595,801 B2
(45) Date of Patent: *Nov. 26, 2013

(54) CREATING TESTS TO IDENTIFY FRAUDULENT USERS

(75) Inventors: J. Galen Buckwalter, Pasadena, CA (US); Erina Lee, Pasadena, CA (US); Robert Scott Ackerman, Pasadena, CA (US); Ella Ruth Grutman, Pasadena, CA (US)

(73) Assignee: eHarmony, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,001

(22) Filed: Jul. 6, 2012

(65) Prior Publication Data

US 2012/0272305 A1    Oct. 25, 2012

Related U.S. Application Data

(63) Continuation of application No. 12/229,222, filed on Aug. 19, 2008, now Pat. No. 8,245,282.

(51) Int. Cl.
  *H04L 29/06*   (2006.01)

(52) U.S. Cl.
  USPC .................................................. 726/4

(58) Field of Classification Search
  None
  See application file for complete search history.

(56) References Cited

U.S. PATENT DOCUMENTS

| | | | |
|---|---|---|---|
| 6,601,048 B1 * | 7/2003 | Gavan et al. | 706/10 |
| 7,086,085 B1 * | 8/2006 | Brown et al. | 726/7 |
| 7,739,189 B1 * | 6/2010 | Rosenblatt et al. | 705/38 |
| 7,822,631 B1 * | 10/2010 | Vander Mey et al. | 705/7.29 |
| 2002/0099649 A1 * | 7/2002 | Lee et al. | 705/38 |
| 2008/0162202 A1 * | 7/2008 | Khanna et al. | 705/7 |
| 2008/0298573 A1 * | 12/2008 | Monk | 379/189 |

\* cited by examiner

*Primary Examiner* — Shaun Gregory
(74) *Attorney, Agent, or Firm* — Van Pelt, Yi & James LLP

(57) ABSTRACT

Member profile information for a control set of one or more control members and for a fraudulent set of one or more fraudulent members are obtained. Each member in the control set is at least believed to be legitimate and each member in the fraudulent set is at least suspected of being fraudulent. A test associated with identifying fraudulent members is generated using the member profile information for the control set and for the fraudulent set; the test inputs one or more pieces of member profile information for a member being tested.

21 Claims, 12 Drawing Sheets

CREATING TESTS TO IDENTIFY FRAUDULENT USERS

CROSS REFERENCE TO OTHER APPLICATIONS

This application is a continuation of co-pending U.S. patent application Ser. No. 12/229,222, entitled CREATING TESTS TO IDENTIFY FRAUDULENT USERS filed Aug. 19, 2008 which is incorporated herein by reference for all purposes.

BACKGROUND OF THE INVENTION

Online or web-based communities or groups are convenient for meeting new people and/or discussing a common interest. Some example groups include matchmaking or dating websites, social networking websites, hobbyist or enthusiast groups, etc. Fraudulent users are and potentially harmful and annoying to legitimate users in a group. In minor cases, they can be annoying because they may send unwanted or unsolicited requests or messages. In more serious cases, a user may be defrauded or otherwise victimized. For example, a fraudulent user may scam another user out of money, information (e.g., a social security number, bank account information, passwords, addresses, etc.), or possessions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
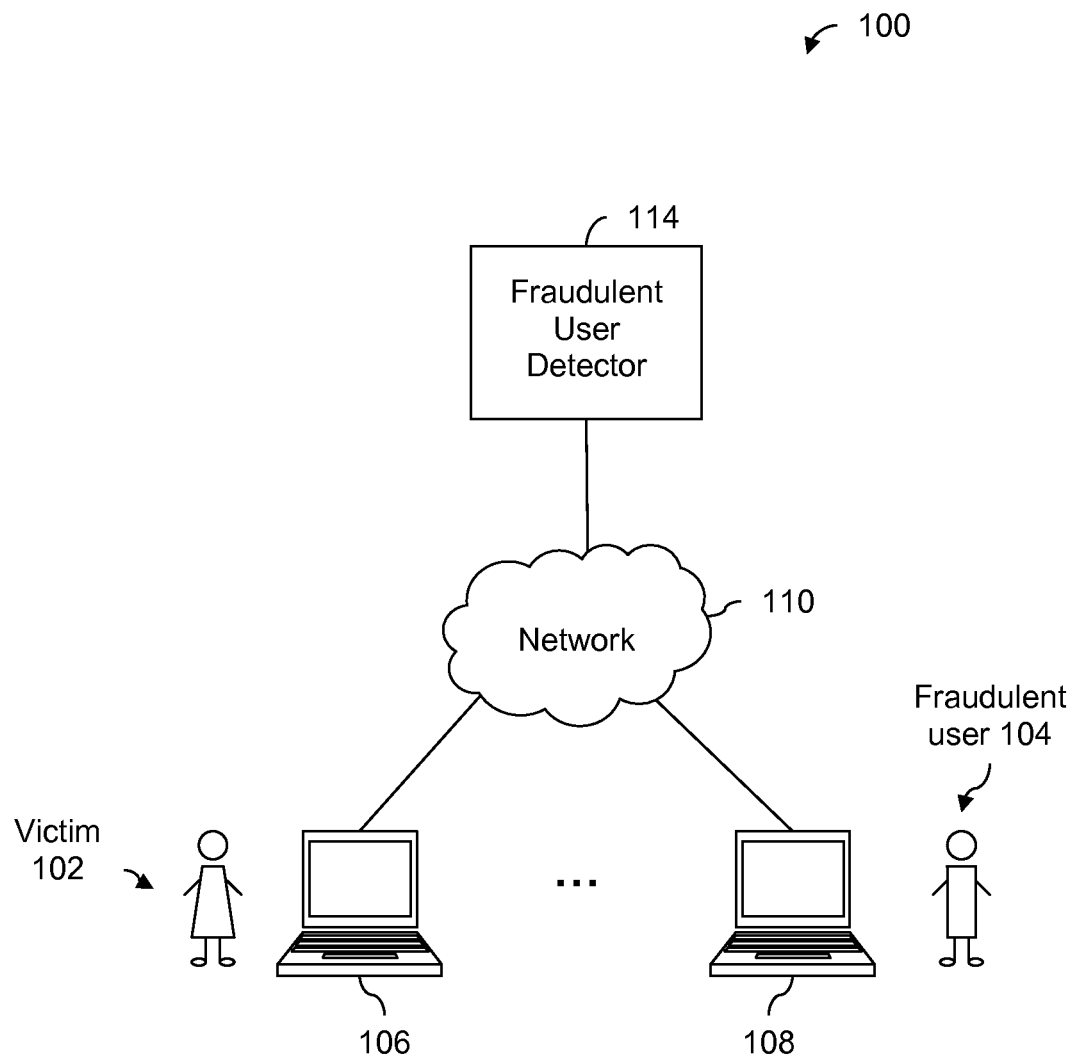
FIG. 1A is a diagram showing an embodiment of a system with a fraudulent user detector.

FIG. 1A is a diagram showing an embodiment of a system with a fraudulent user detector. Victim 102 (in this example, a woman) and fraudulent user 106 (in this example, a man) are members of the same online or web-based community or group. In one example, they are members of the same social networking website. In another example, they are members of a matchmaking website, such as eHarmony.com. Victim 102 and fraudulent user 104 communicate with each other via network 110 using computers 106 and 108, respectively.

As used herein, a fraudulent user is a user who gains or attempts to gain something from another user, for example using deception or lies. In some cases, the gain is monetary (e.g., fraudulent user 104 attempts to gain money from victim 102). Fraudulent user 104 may attempt this by eliciting sympathy from victim 102 (e.g., fraudulent user 104 or someone else needs surgery), tempting victim 102 with the possibility of gain for victim 102 (e.g., fraudulent user 104 claims victim 102 has won a prize and victim 102 needs to pay a processing fee to obtain the prize), playing on a personal desire of the victim (e.g., victim 102 is lonely and fraudulent user 104 claims to need money to travel from his home to meet victim 102), etc. In some cases, fraudulent user 104 is an identity thief and tries to obtain a victim's social security number, account number, PIN or other password, etc.

Fraudulent user detector 114 identifies fraudulent users in system 100. For example, fraudulent user detector 114 obtains data associated with a user, analyzes the data using some test, and outputs a decision (e.g., whether or not that user is fraudulent). Appropriate action is then taken against an identified fraudulent user. In some embodiments, fraudulent user detector 114 can output three or more decisions or outputs (e.g., is (not) a fraudulent user, insufficient information to make a determination, etc.). Some embodiments of a fraudulent user detector and a test used by a fraudulent user detector are described in further detail below.

In various embodiments, network 110 comprises any appropriate communications network that enables one user to communicate with another user and any appropriate device (e.g., as an alternative to computers 106 and 108) may be used to connect to and/or communicate on the network. In various embodiments, network 110 is a wireless/wired network, broadband data network, mobile telephone network, etc.

Fraudulent user detector 114 offers a number of advantages. For users, it prevents or mitigates the annoyance and potential harm caused by a fraudulent user. In some cases, a fraudulent user is identified before (s)he communicates with any other user (e.g., at sign up). For group or website administrators, fraudulent user detector 114 can reduce the amount of manual work and/or harm caused by fraudulent users. Rather than having to wait for other users to report fraudulent users and respond manually to these reports, fraudulent users can be identified and handled automatically. Fraudulent users in some cases are identified and removed from the group sooner, thus reducing the likelihood that legitimate users will become annoyed and leave the group. In other cases, fraudulent users may be required to complete further steps such as answering additional questions. This process may prove unacceptable to fraudulent users who may this abandon attempts to use the system while non-fraudulent users may simply answer the additional questions.

In some embodiments, fraudulent user detector 114 is configured to store and/or execute multiple tests. For example, one test targets one type of fraudulent user and another test targets another type of fraudulent user. On an online dating or matchmaking website, one type of fraudulent user may tend to present a persona of a man in his 50s, highly educated, and a widower who targets women. Some other fraudulent users may tend to present themselves as women in their early 30's, never married, and target men as their victims. Some systems perform better when there are multiple tests (each corresponding to a particular type of fraudulent user) compared to a single test that attempts to identify multiple types of fraudulent users.

Figure 1B:
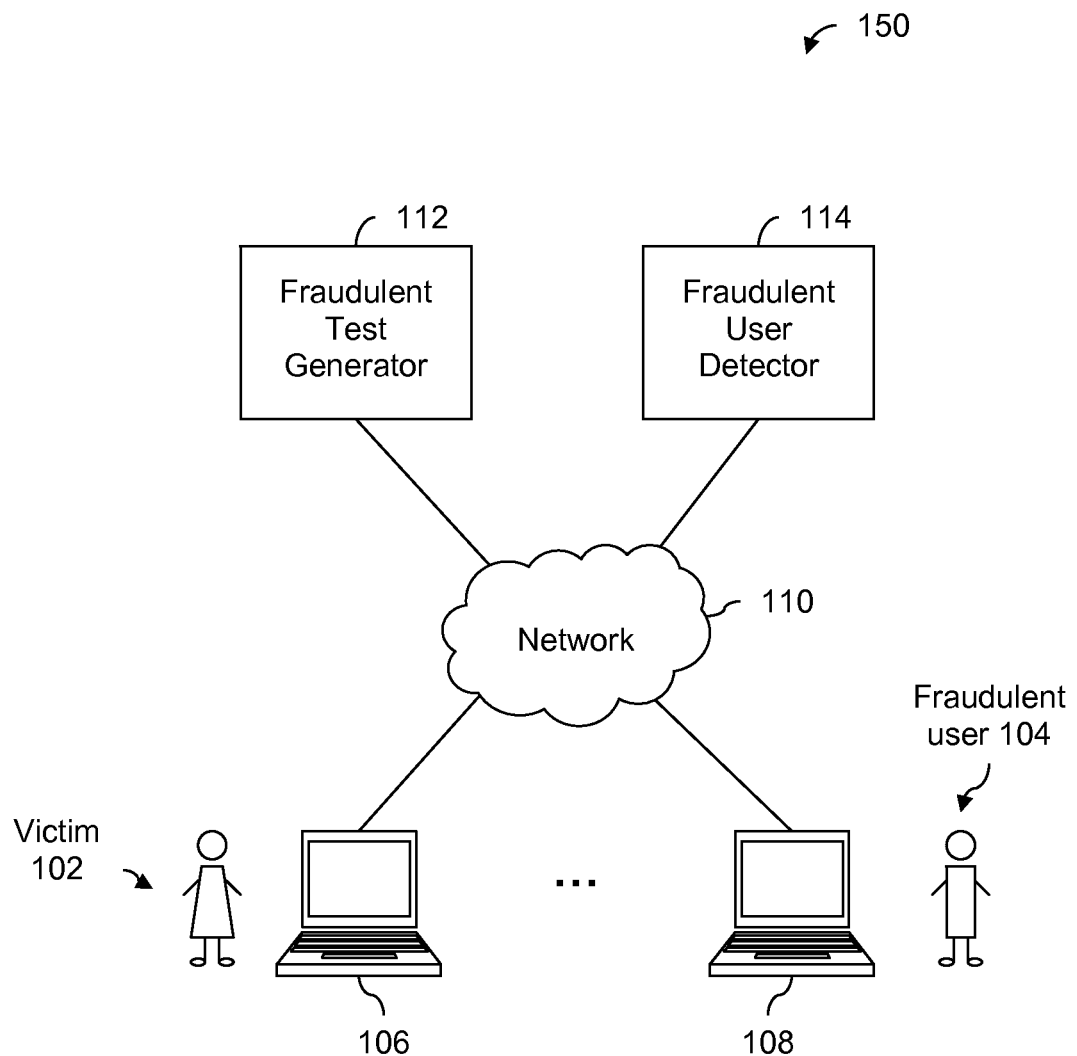
FIG. 1B is a diagram showing an embodiment of a system with a fraudulent user detector and a fraudulent test generator.

FIG. 1B is a diagram showing an embodiment of a system with a fraudulent user detector and a fraudulent test generator. In the example shown, system 150 is similar to system 100 and the same reference numbers are used to indicate components that are common to both. In this example, fraudulent test generator 112 generates the test used by fraudulent user detector 114 to identify fraudulent users in the system.

In this example, fraudulent test generator 112 obtains data associated with a group of fraudulent users (e.g., known or suspected from reports by users of the system) and data associated with a control group (e.g., who have never displayed fraudulent activity or patterns). The test is generated by analyzing and/or comparing the two sets of data.

A fraudulent test generator is useful because tests can adapt to changes by fraudulent users. For example, as fraudulent users become aware of a test and attempt to change their profile or other data to avoid identification, the test can adapt using new data.

In some embodiments, fraudulent test generator 112 and/or fraudulent user detector 114 is/are run periodically. For example, a new test may be generated every three months, once a year, etc. In some embodiments, the data used to generate a test is updated or refreshed prior to generating a new test. In some embodiments, fraudulent test generator 112 and/or fraudulent user detector 114 is/are run on an event driven basis. For example, the fraudulent user detector 114 may be run every time a certain number of new users join a website or group.

Figure 2:
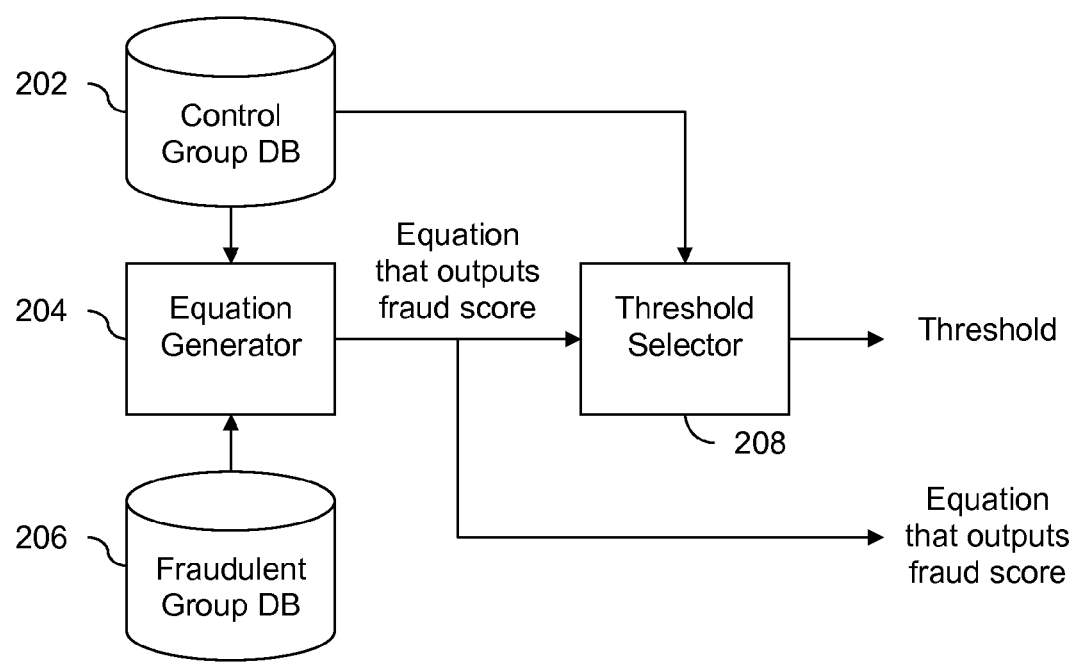
FIG. 2 is a diagram showing an embodiment of a fraudulent test generator.

FIG. 2 is a diagram showing an embodiment of a fraudulent test generator. In some embodiments, fraudulent test generator 112 of FIG. 1B is implemented as shown and generates (1) an equation that outputs a fraud score (representing the likelihood a user is fraudulent) and (2) a threshold against which the fraud score is compared. In the examples described herein, if the fraud score generated for a given user is greater than the threshold, the user is determined to be fraudulent. In some other embodiments, a test is implemented in some other manner.

Equation generator 204 obtains data from control group database 202 and fraudulent group database 206. Using the data from the two databases, a test to identify fraudulent users is generated. In some embodiments, the test is in the form of a multivariable function (also referred to as an equation) that inputs demographics, characteristics, number and type of messages to/from the user, or other data associated with a user and outputs a fraud score.

Threshold selector 208 is configured to input the equation output by equation generator 204 and output a threshold by applying the equation to the data from control group database 202. In this example, threshold selector 208 weighs the number of false positives that would occur against the number of true fraudulent users that would be identified for a given threshold level. This selection may be application specific. In applications where it is important to identify fraudulent users and false positives are acceptable, a lower threshold value is desirable since more users would be identified as being fraudulent (if a higher fraud score corresponds to a higher probability that a user is fraudulent). In other applications where false positives are unattractive (e.g., false positive users might get annoyed and leave), a higher threshold value that results in fewer false positives is desirable.

In this example, databases 202 and 206 include characteristics or demographics provided by a user. Some examples of characteristics or demographics include gender, location or residence, marital status, number of previous marriages, whether a person wants (more) children, number of children, frequency of smoking, frequency of drinking, education, income, etc. In some embodiments, a test is generated using other information such as a communication to/from a particular user, psychographic data (e.g., obtained using a personality questionnaire or test), etc. In some applications, users have to pay to be members of the community or group. In some embodiments, any problem charging the membership fee to the credit card (e.g., because the credit card is reported stolen) is used as a variable to generate a fraud score (i.e., a problem in paying the membership fee would increase the probability or likelihood that that user is a fraudulent user).

In various embodiments, fraudulent group database 206 includes data associated with known and/or suspected fraudulent users. In some embodiments, data in database 206 is aged. For example, database 206 in some cases includes data for fraudulent users that were identified within the last three months to keep the data fresh. In some embodiments, data is removed from database 206 once a lifetime is exceeded or data is weighted less as it gets older.

In some embodiments, threshold selector 208 has a dial or other input which affects how aggressive of a threshold to output. For more aggressive applications, this dial or input can be set higher and the threshold that is output by threshold selector 208 is correspondingly lower, which results in more users being identified as fraudulent. For less aggressive identification of fraudulent users (and fewer false positives), this value can be set lower.

Figure 3:
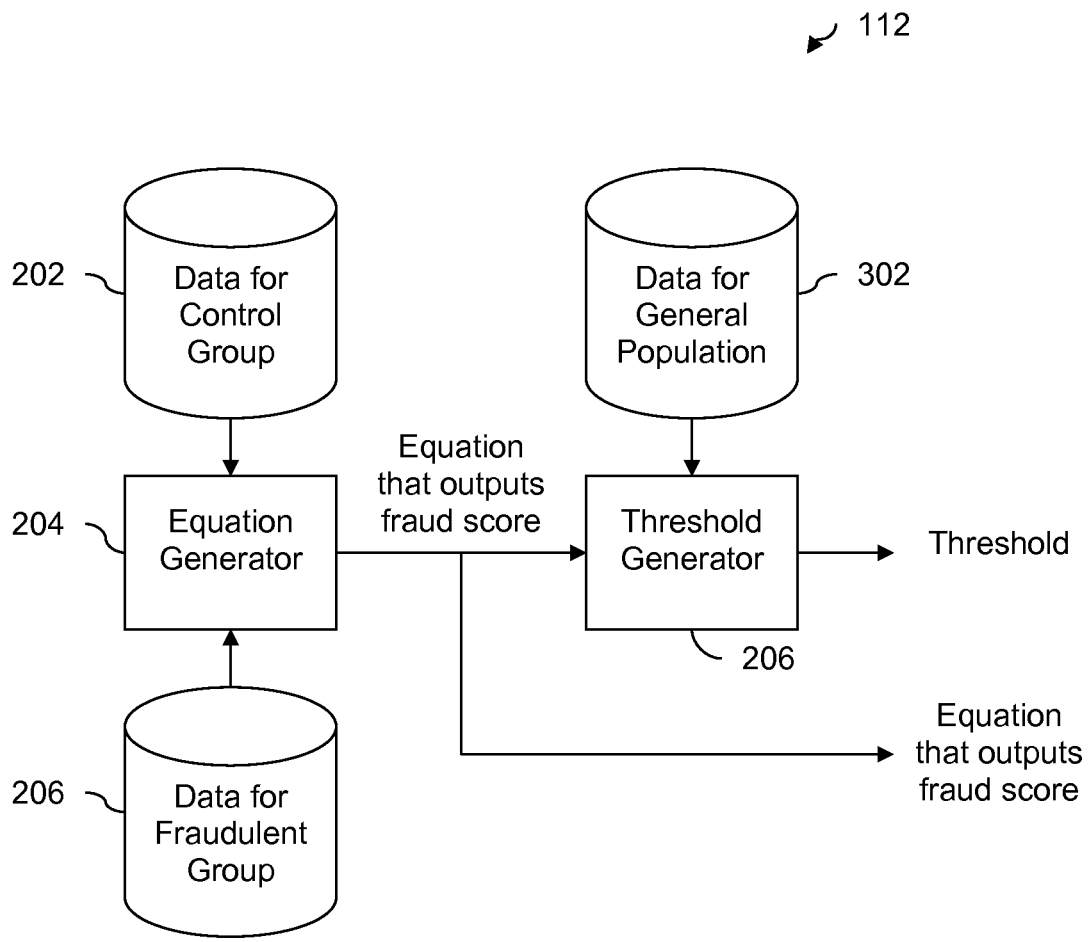
FIG. 3 is a diagram showing an embodiment of a fraudulent test generator where a control group is used to generate an equation and general population is used to select a threshold.

FIG. 3 is a diagram showing an embodiment of a fraudulent test generator where a control group is used to generate an equation and general population is used to select a threshold. This embodiment is similar to that shown in FIG. 2, except the system includes two databases: one that stores data for a control group and one that stores data for a general, representative, or otherwise typical population. In some embodiments, the users associated with control group database 202 do not overlap with the users associated with general population database 302. In some embodiments, the control group associated with database 202 is a subset of the users associated with general population database 302. For example, a social networking website may have 1 million members and database 202 stores information for 10,000 of those users and database 302 includes information for all 1 million members. In this particular example, database 202 is associated with users who are known to be non-fraudulent whereas database 302 includes both known fraudulent users and known non-fraudulent users.

Figure 4:
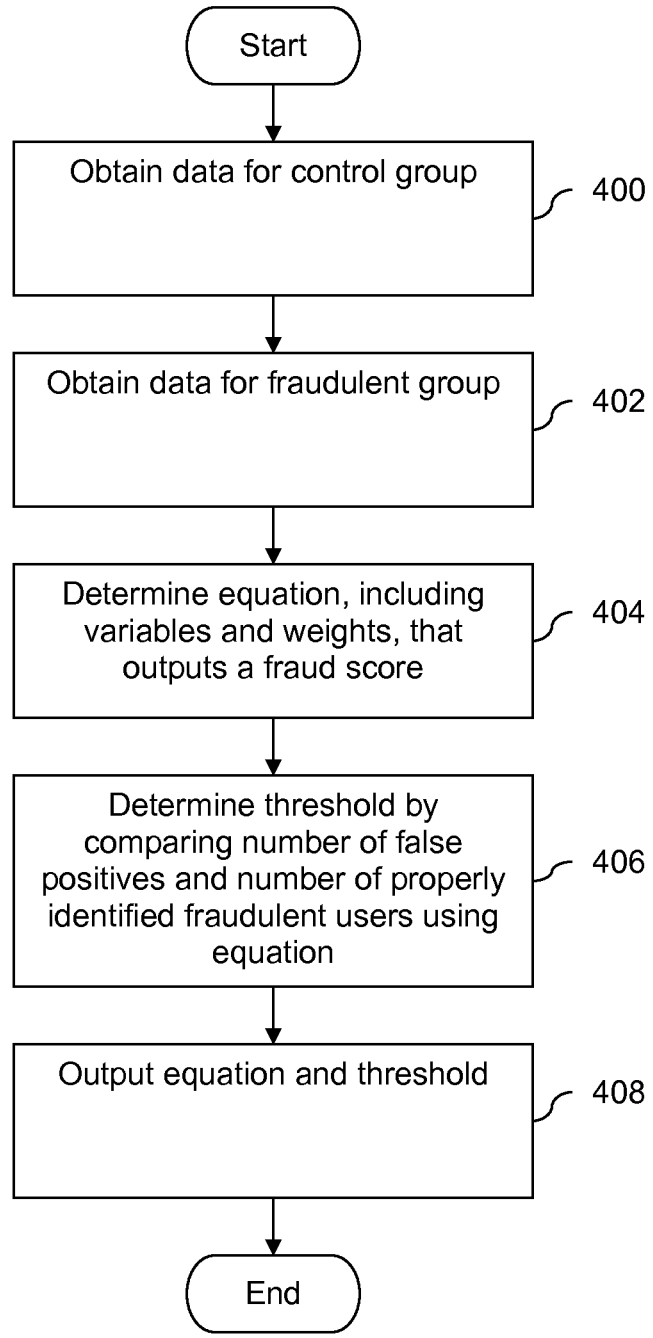
FIG. 4 is a flowchart illustrating an embodiment of a process to generate a test for fraudulent users.

FIG. 4 is a flowchart illustrating an embodiment of a process to generate a test for fraudulent users. In the example shown, the process is performed by fraudulent test generator 112 of FIG. 1B. At 400, data for a control group is obtained. In some embodiments, a control group only contains known non-fraudulent users. Data for a fraudulent group is obtained at 402.

An equation, including variables and weights or scores, that outputs a fraud score is determined at 404. As used herein, a variable is a piece of data about a user that can take on two or more values, states, etc. In various embodiments, a variable is a demographic (e.g., age, income, level of education, gender, etc.), a piece of psychographic data (e.g., a personality type or personality characteristic), a source channel (e.g., how a user heard about or joined a group or website), or a communication channel (e.g., a user's email provider such as yahoo.com, aol.com, or gmail.com or a telephone number). For each variable that is part of an equation, a weight or score is assigned for some or all of the possible values for that variable. In one example, if the value of a variable=A, X is added to a fraud score, if the value of the variable is between B and C, Y is subtracted from the fraud score, and for all other values of the variable the fraud score does not change.

In some embodiments, statistics software is used to analyze and/or compare the data obtained at 400 and 402. In some embodiments, a chi-square test is performed on the data obtained at 400 and 402. As an example, suppose an equation is being generated to identify fraudulent users of an online matchmaking service. In some cases, fraudulent users of the example online matchmaking service tend to specify information about himself/herself that is too good to be true. For example, they may claim to have a high income, be highly educated, open to having children, are okay with children in their potential date/match, do not smoke, and do not drink. Each of these pieces of data (e.g., income, education level, okay with children of a possible partner, etc.) are potential variables for the equation. In this example, statistics software identifies the variables to include in the equation (e.g., income) and determines values for those variables fraudulent users tend to specify (e.g., more than $125,000 in income) and determines weights for certain values of the variable. For example, a typical user of the online matchmaking service may request matches within a reasonable radius (e.g., within their metropolitan area, within 25 miles, etc.) whereas fraudulent users often indicates they are willing to be matched to someone relatively far away (e.g., over 1000 miles, in another state, etc.). This variable may be a stronger indicator than some other variable (e.g., gender). A higher weight or number of points (e.g., indicative of a fraudulent user) is assigned if the user is willing to be matched to someone relatively far away whereas a low (e.g., negative) weight or score may be assigned if the user indicates they only want to be matched to people in their local area or a reasonable distance away.

At 406, a threshold is determined by comparing a number of false positives and a number of properly identified fraudulent users using the equation. In the example of FIG. 2, the equation is applied to the same control group database 202 used to generate the equation. In the example of FIG. 3, the equation is applied to general population database 302 whereas control group database 202 is used to generate the equation.

In one example of how a threshold is selected, two potential threshold levels are examined. Any number of possible thresholds can be considered. For this particular equation and data set, the first potential threshold value identifies 85.0% of fraudulent users but would also result in 9.8% of legitimate users being identified as fraudulent (i.e., false positives). The second possible threshold value would correctly identify 89.2% of fraudulent users but would result in 16.2% of legitimate users being incorrectly identified as fraudulent. In this example, the first potential threshold value is selected since for this application the additional 4.2% increase in correctly identified fraudulent users is not worth the additional 6.4% of false positives.

The equation and threshold are output at 408.

Figure 5:
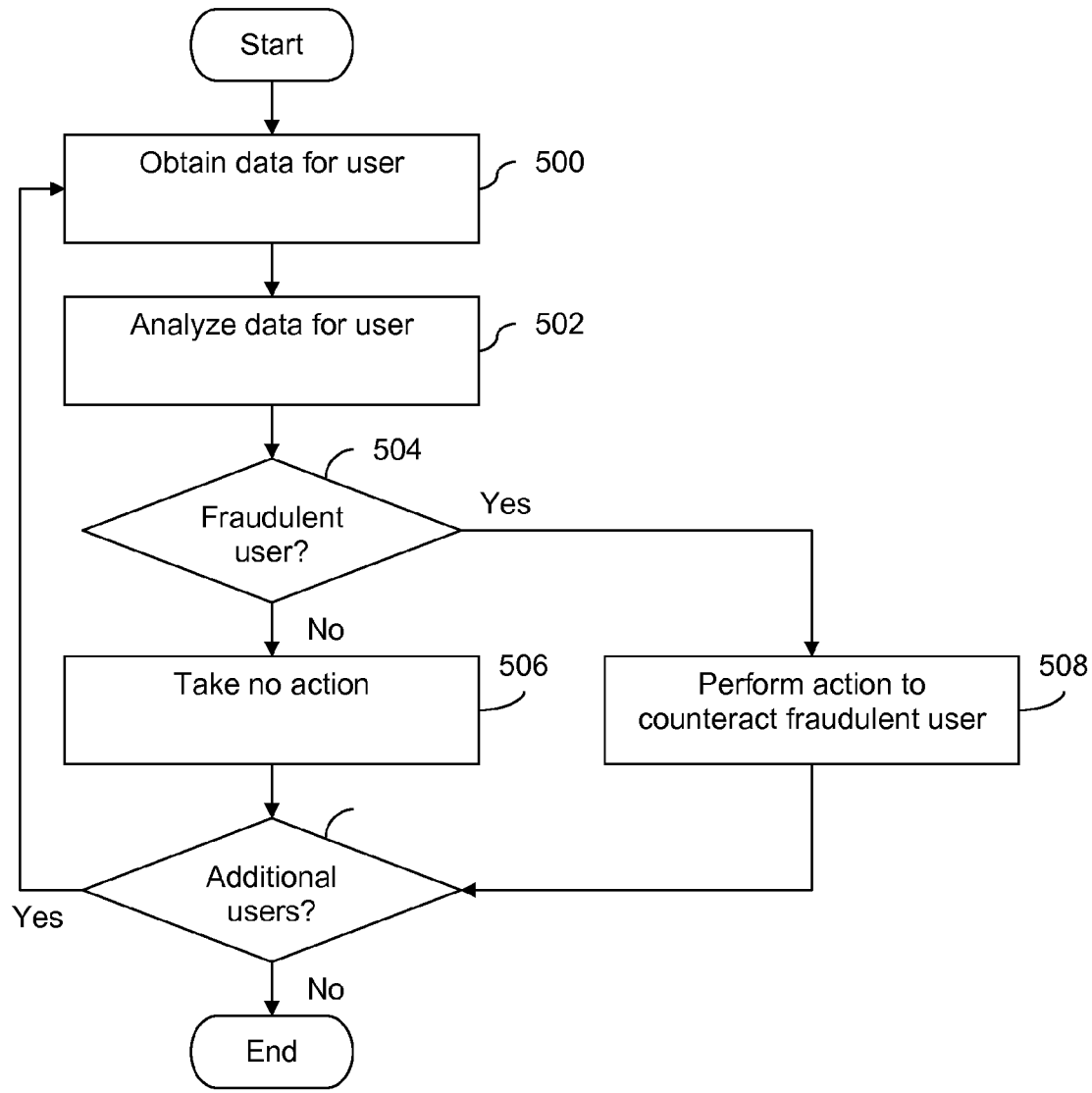
FIG. 5 is a flowchart illustrating an embodiment of a process for detecting fraudulent users.

FIG. 5 is a flowchart illustrating an embodiment of a process for detecting fraudulent users. In some embodiments, fraudulent user detector 114 of FIG. 1A or 1B performs the example process. In some embodiments, the process is performed on new users when they join a group or soon thereafter. In some embodiments, the process is performed periodically.

At 500, data for a user is obtained. In various embodiments this includes demographics, characteristics, psychographic data, etc. Data for the user is analyzed at 502. At 504 it is determined whether the user is fraudulent. If so, an action is performed to counteract the fraudulent user at 508. Otherwise, no action is taken at 506. After step 506 or 508 is performed, it is determined at 510 whether there are additional users to be evaluated. If so, data for the next user is obtained at 500.

In this example, a "hard" decision is made by the process. That is, the only two permitted outcomes or decisions are "Yes, the user is fraudulent" or "No, the user is not fraudulent". In some embodiments, a process is configured to make a "soft" decision. For example, the process may output a likelihood or probability the user is a fraudulent user (e.g., 0 means the process is absolutely certain the user is not fraudulent, 1 means the process absolutely certain the user is fraudulent, and 0.5 means the user could (equally) be either fraudulent or not fraudulent). In some embodiments, a process has the option of outputting a "Not enough information" flag and does not make a decision about whether a user is fraudulent. In some embodiments, a process outputs a decision to monitor the user or to require the user to engage in further activities or interaction with a system. A user is suspected of being fraudulent, but there may not be enough evidence or sufficient weight to determine that to a sufficient degree of certainty. These users in some embodiments are required to engage in further activities or interaction such as answering additional questions to determine if the user will engage with the system or will leave due to the extra requirements that may cause the user to suspect they have been identified.

The following figure shows a more specific embodiment in which a fraudulent user detector uses a test which includes an equation which generates a fraud score and a threshold against which the fraud score is compared.

Figure 6:
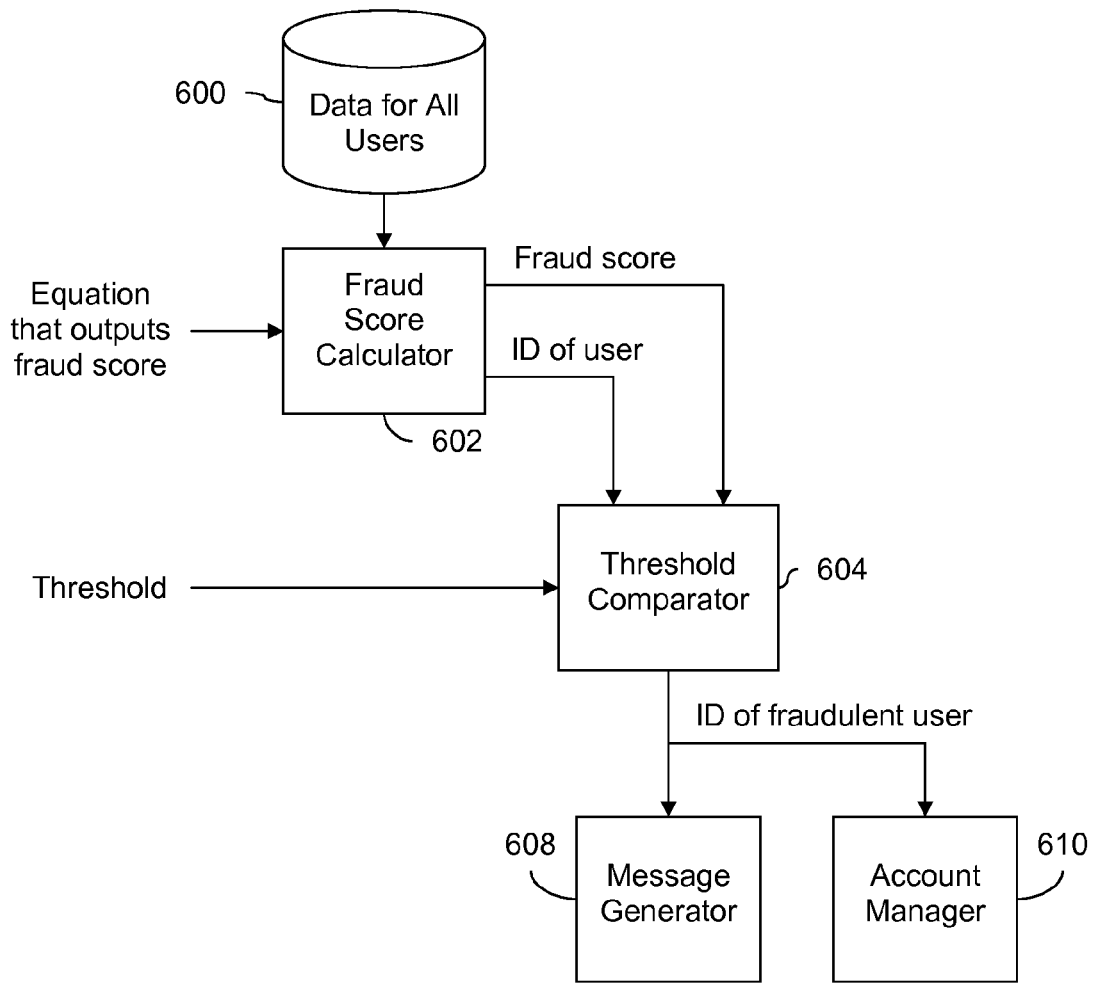
FIG. 6 is a diagram showing an embodiment of a fraudulent user detector.

FIG. 6 is a diagram showing an embodiment of a fraudulent user detector. In some embodiments, fraudulent user detector 114 of FIG. 1A or 1B is implemented as shown. In some embodiments, the equation and threshold are received from fraudulent test generator 112 of FIG. 1B. Any test for identifying fraudulent users can be used and in some embodiments it is not generated using the techniques disclosed herein. Any appropriate test from any appropriate source may be used to detect fraudulent users.

Database 600 stores data for all users of a website or group. Fraud score calculator 602 inputs data from database 600 and an equation and outputs a fraud score and corresponding ID for a user; these are passed to threshold comparator 604. Threshold comparator 604 compares the received fraud score to the threshold which is input to it. If the fraud score is higher than the threshold, that user is identified as a fraudulent user. IDs of fraudulent users are passed from threshold comparator 604 to message generator 608 and account manager 610.

Message generator 608 determines which users the identified fraudulent user has been in contact with and sends messages to those users. For example, the message may inform the recipient a person they have been in contact with has been identified as a fraudulent user and remind the recipient how to protect themselves (e.g., don't give out personal information, don't give out money, contact authorities or management if they become suspicious of another users, etc.).

Account manager 610 controls access to and (in general) manages the accounts of users. In this example, account manager 610 will close an account or otherwise not permit a fraudulent user to access their account or send a communication to other users once they have been identified as fraudulent.

The actions performed once a fraudulent user is identified described above are merely examples and vary depending upon the particular application. In another application, a website requires one user to invite another user to become a member of the website (i.e., referral based). In that application, the referring member may be flagged or evaluated for fraudulent activity since they recommended or invited a fraudulent user to become a member.

Figure 7:
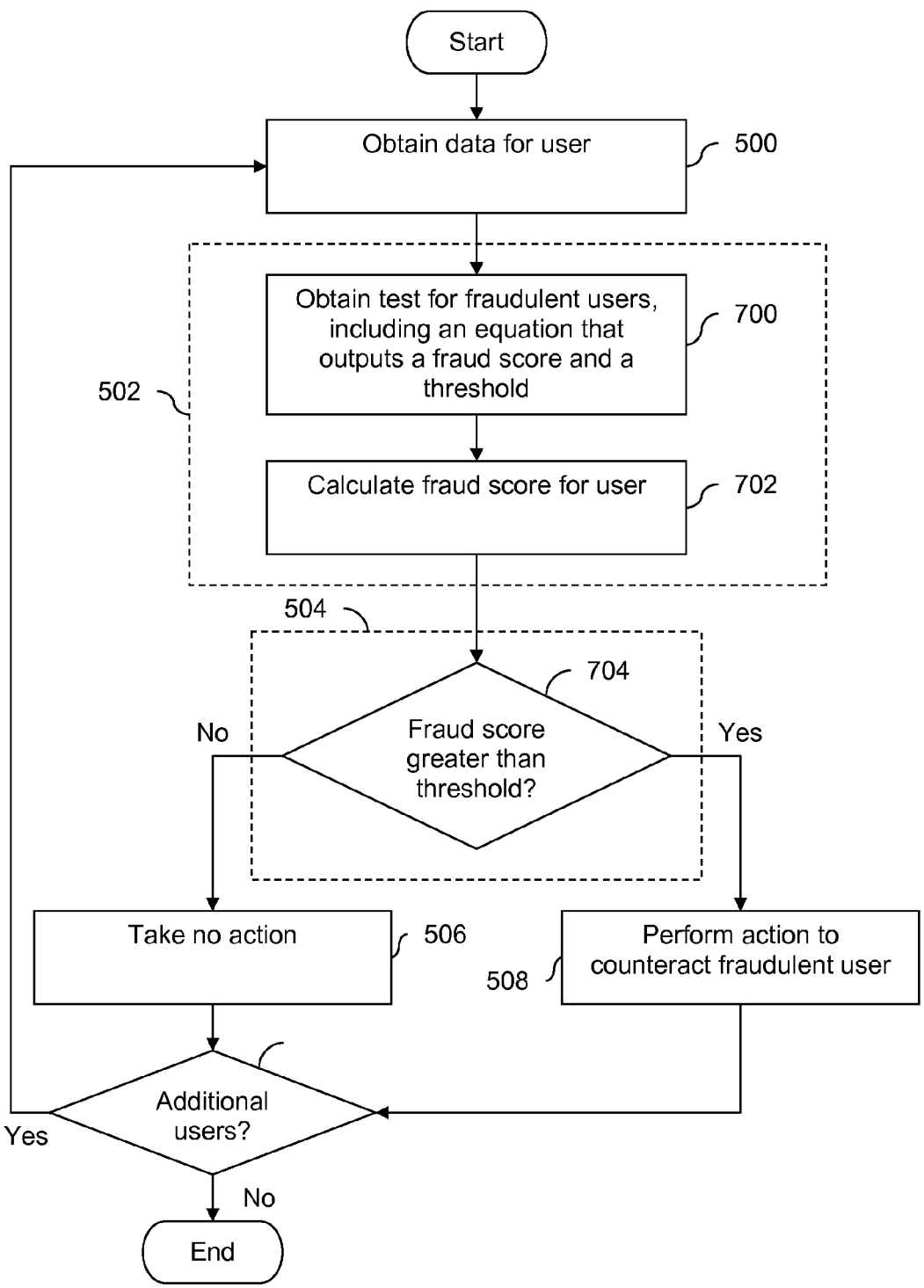
FIG. 7 is a flowchart illustrating an embodiment of a process that detects a fraudulent user using an equation that generates a fraud score and compares it to a threshold.

FIG. 7 is a flowchart illustrating an embodiment of a process that detects a fraudulent user using an equation that generates a fraud score and compares it to a threshold. In the example shown, the process is a more detailed example of the embodiment described in FIG. 5 and corresponding steps use the same reference numbers. At 500, data is obtained for a user. For example, fraud score calculator 602 in FIG. 6 accesses database 600 for a particular user's data.

In this example, step 502 (analyzing data for a user) includes steps 700 and 702. At 700, a test for fraudulent users is obtained, including an equation that outputs a fraud score and a threshold. In some embodiments, the test is programmed into a device. In the example of FIG. 1B, the test is obtained from fraudulent test generator 112. At 702, a fraud score is calculated for that user.

Step 504 (determining whether a user is fraudulent) includes step 704. At 704, it is determined whether the fraud score is greater than the threshold. If so, an action to counteract the fraudulent user is performed at 508; otherwise, no action is taken at 506. After step 506 or step 508, it is determined at 510 whether there are additional users to be evaluated.

Figure 8:
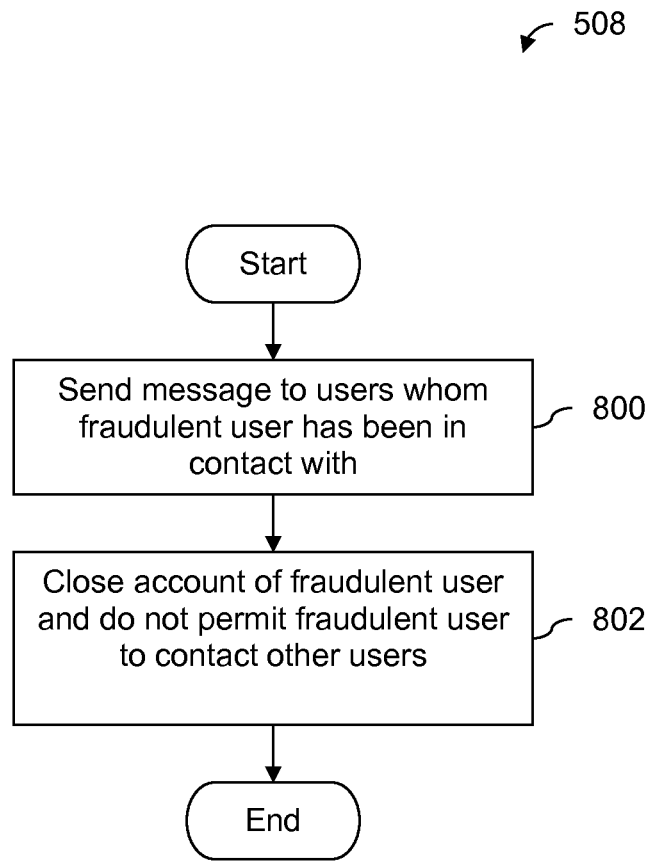
FIG. 8 is a flowchart illustrating an embodiment of a process that performs an action to counteract a fraudulent user.

FIG. 8 is a flowchart illustrating an embodiment of a process that performs an action to counteract a fraudulent user. In some embodiments, step 508 of FIG. 5 is implemented as shown. In some other embodiments, counteracting a fraudulent user includes some other set of actions.

At 800, a message is sent to users whom a fraudulent user has been in contact with. In FIG. 7, for example, this step is performed by message generator 608. In some embodiments, a message tells the recipient they have been in contact with a fraudulent user and indentifies the fraudulent user (e.g., by email address, user name, etc.). In some embodiments, a message reminds a recipient about safety precautions to protect themselves from fraudulent users (e.g., do not give out personal information, do not send money, do not give out a social security number, etc.).

The account of the fraudulent user is closed and the fraudulent user is not permitted to contact other users at 802. In FIG. 7, for example, this step is performed by account manager 610.

Figure 9A:
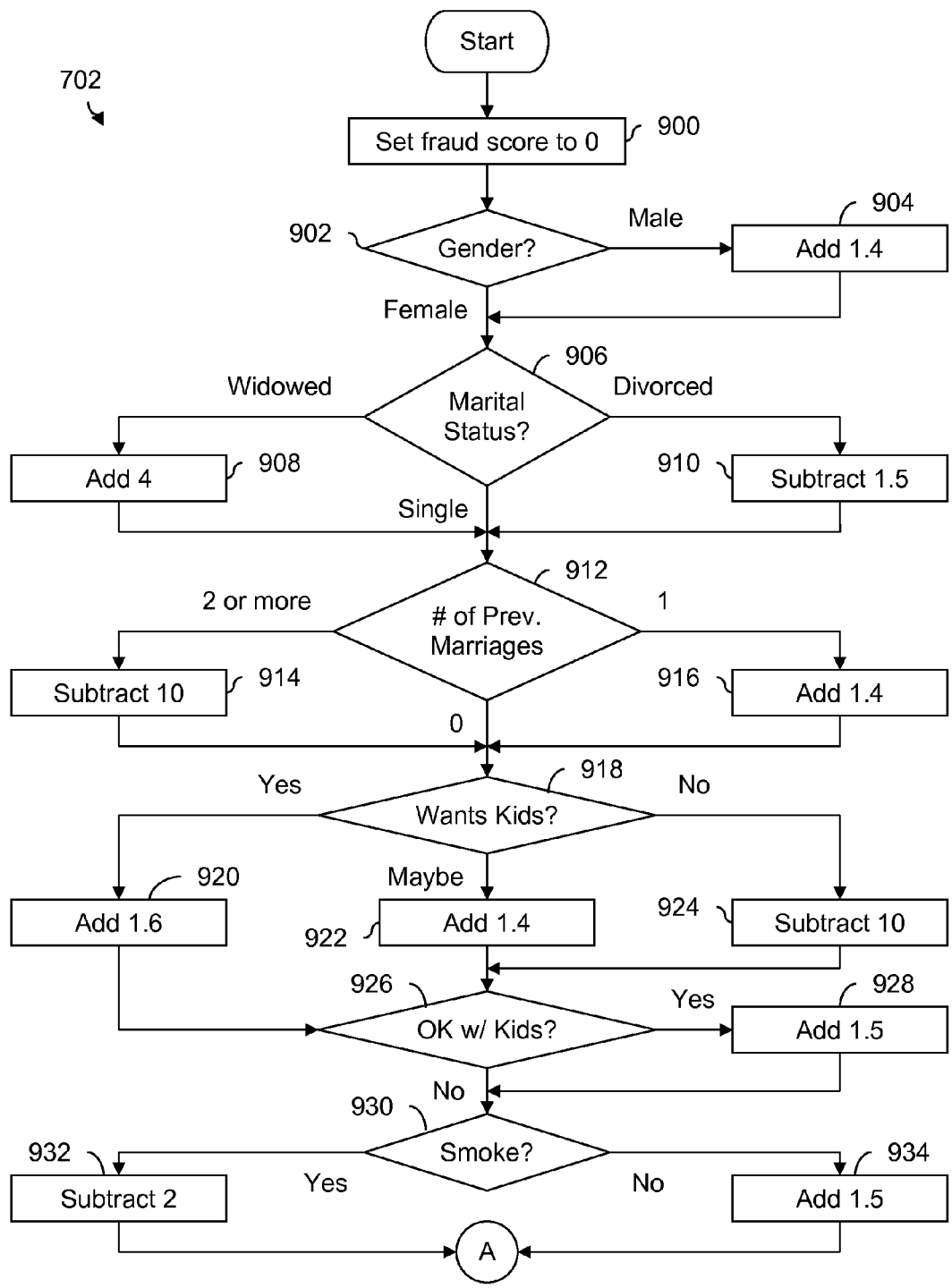
FIG. 9A shows a first portion of a flowchart illustrating an embodiment of a process to generate a fraud score.
Figure 9B:
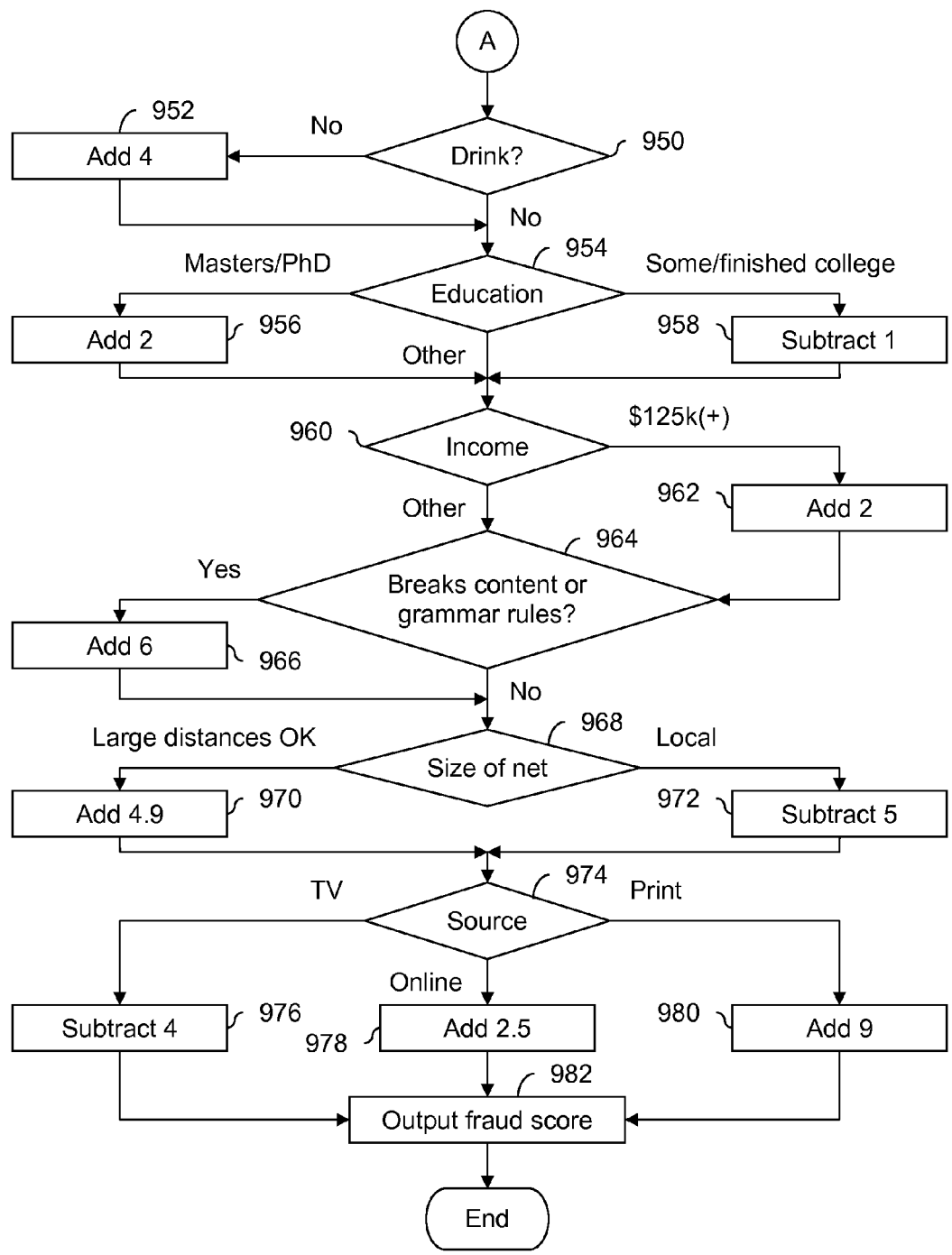
FIG. 9B shows a second portion of a flowchart illustrating an embodiment of a process to generate a fraud score.

FIGS. 9A and 9B show a flowchart illustrating an embodiment of a process to generate a fraud score. In some embodiments, step 702 of FIG. 7 (i.e., calculating a fraud score for a user) is performed as shown. In other embodiments, other variables and/or weights are used. The example application described here is an online dating or matchmaking website where users provide information about themselves and specify preferences about potential matches or partners. In this particular example, points are added/subtracted and the result is output as the fraud score for that user. In some other embodiments, a test is implemented differently (e.g., a multivariable function such as $f(x)=\alpha x_1+\beta x_2+\ldots$).

In general, fraudulent users in this example tended to represent themselves attractively and provided characteristics, preferences, and such accordingly. They also want to meet or communicate with as many people as possible. In some embodiments, the example test is generated by obtaining and analyzing data associated with a fraudulent group as well as data associated with a control group. The particular data obtained and analyzed in such embodiments affects the test generated accordingly. For example, if the data associated with fraudulent users tended to have male victims and female fraudulent users (or at least, represented themselves as female), the test would correspondingly change (e.g., points at step 904 would be added if the user is female instead of male).

At 900, the fraud score is set to 0. At 902, the gender of the user is determined. If the user is male, 1.4 points are added at 904. In this example, fraudulent users tended to be men.

After adding 1.4 points at 904 or if the user is female, the marital status of the user is determined at 906. In this example, it is assumed a married person would not be a member of a dating or matchmaking website and that option is not listed. If the user is widowed, 4 points are added at 908. If the user is divorced, 1.5 points are subtracted at 910. In this example, fraudulent users tended to represent themselves as widowed. For example, other users may perceive a widowed person to be desirable enough to have previously been married but is now single again through no fault of their own; a divorced person may be perceived as having a possible fault which caused the divorce.

After adding points at 908, subtracting points at 910, or if the user is single, the user's number of previous marriages is determined at 912. If the user has two or more marriages, 10 points are subtracted at 914. If the user has one previous marriage, 1.4 points are added at 916. Fraudulent users in this example did not tend to represent themselves as having multiple previous marriages. Other users may perceive this as being undesirable in a partner or match and fraudulent users want to attract other users in order to communicate with them.

After subtracting points at 914, adding points at 916, or if the user had no previous marriages, it is determined at 918 if the user wants (more) children. If the user responded "Yes" or "Maybe" then 1.6 points or 1.4 points are added (respectively) at 920 or 922. If the user responded "No" then 10 points are subtracted at 924.

After adding points at 920 or 922 or subtracting points at 924, it is determined at 926 if the user is okay with kids. For example, this may be in response to a question "Are you OK dating (being matched to) someone who has children?". If so, 1.5 points are added at 928. For example, fraudulent users tend to want to communicate with everyone and do not want to "turn off" users with children.

After adding points at 928 or if the user is not okay with children, it is determined if the user smokes at 930. If so, 2 points are subtracted at 932. If the user does not smoke, 1.5 points are added at 934.

At 950, it is determined if a user drinks. If the user indicates they do not drink, 4 points are added at 952.

At 954, a user's education level is determined. If the user indicates they have a master's degree or doctorate, 2 points are added at 956. If the user indicates they did some college work or finished college, 1 point is subtracted at 958. For all other responses (e.g., high school diploma, some high school, etc.) no points are added or subtracted.

A user's income is determined at 960. If a user indicates they make $125,000 or more, 2 points are added at 962. Otherwise, no points are added or subtracted.

Whether a user breaks content or grammar rules is determined at 964. An example of a content rule is a policy or rule set by an administrator or website regarding the content of messages, postings, etc. For example, some websites have a rule that users are not permitted to include or post an email address or telephone number during an initial communication phase. In this particular example, fraudulent users want to communicate with victims (e.g., offline) and may post their email address (or other contact information) even if they are prohibited from doing so. In some embodiments, a content rule prohibits advertising a product or service on the website. In some embodiments, a content rule prohibits the use of certain words (e.g., obscene or offensive). A grammar rule is generally defined as proper use of a language. A user breaks a grammar rule when they (for example) use improper spelling, syntax, etc. In this example, fraudulent users tend to be non-native English speakers and tend to break grammar rules. If a grammar or content rule is broken, 6 points are added at 966.

The size of a user's net is determined at 968. In this example, this corresponds to an acceptable distance or range between the user and a potential match or partner. Most legitimate users in this example cast a net with a reasonable distance, such as in the same metropolitan region, within 25 miles, etc. If a user indicates large distances are okay, 4.9 points are added at 970. If a user specifies a local net, 5 points are subtracted at 972.

The source of a user is determined at 974. As used herein, a source is a channel by which a user became aware of and/or joined an online group or website. In this example, the possible source channels are television (e.g., a television ad), online (e.g., an email sent to the user or an advertisement on another website), or print (e.g., in a newspaper or in a flyer mailed to or otherwise distributed). In some other embodiments, a user may originate from some other channel. If the user indicates his/her source is television, 4 points are subtracted at 976. For example, this particular online group or website may advertise quite a bit on television and most legitimate users have seen the ads. If the user indicates his/her source is online, 2.5 points are added at 978. If the user indicates his/her source is print, 9 points are added at 980. For example, this particular online group or website may not use advertise on the Internet.

At 982, the fraud score is output.

Figure 10:
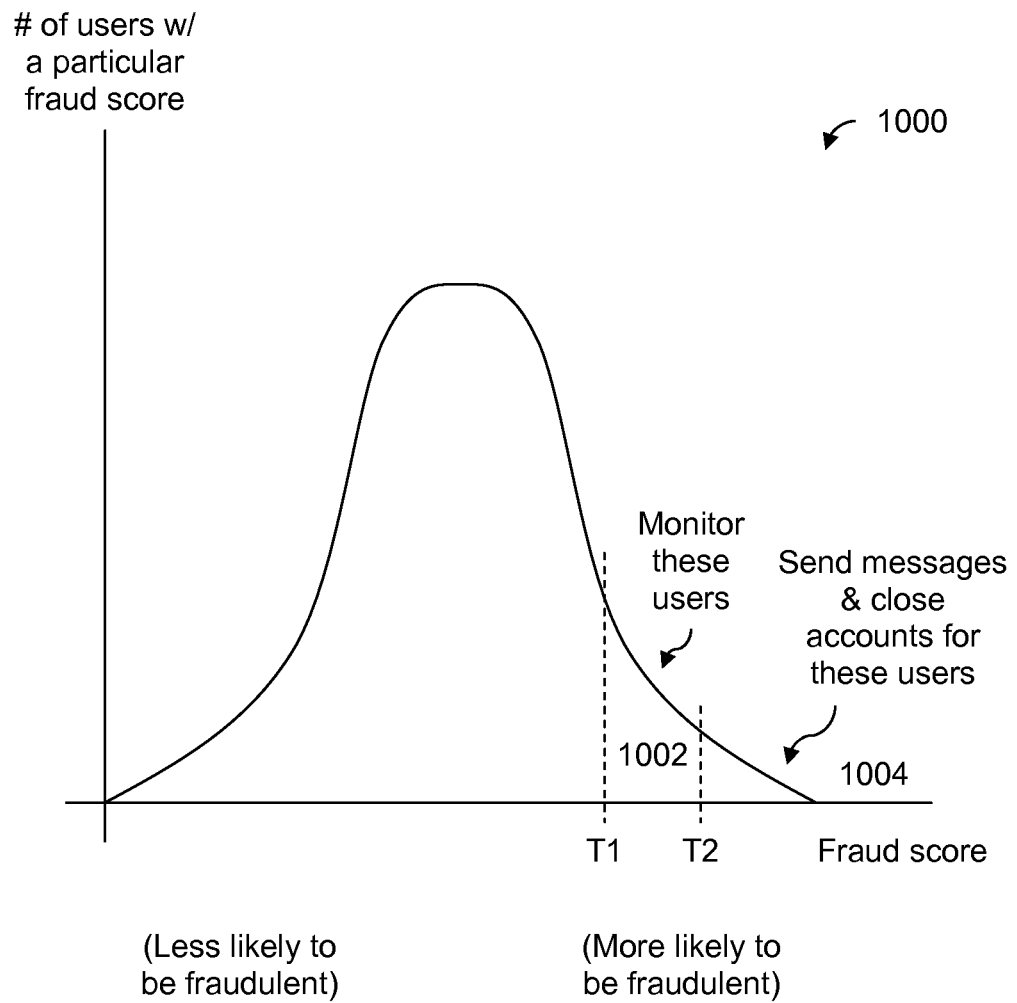
FIG. 10 is a diagram showing an embodiment of a fraudulent user test with multiple thresholds.

FIG. 10 is a diagram showing an embodiment of a fraudulent user test with multiple thresholds. In the example shown, graph 1000 shows a distribution of fraud scores with fraud scores along the x axis and the number of users with a particular fraud score along the y axis. Two thresholds, T1 and T2, are used in this example test where T2>T1. A higher fraud score corresponds to a higher probability or likelihood that a user is fraudulent. Users in region 1004 with fraud scores above T2 are identified as fraudulent users and appropriate action is taken. In this particular example, the accounts of the fraudulent users are closed and people whom they have been in contact with are notified. Users in region 1002 with fraud scores in the range of T1 and T2 are monitored. In some embodiments, the communications (e.g., past or future) of a user being monitored is examined for improper content or possible fraudulent activity. In some embodiments, monitoring is performed by a person, for example a person who specializes in fraud.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating a test, comprising:
    obtaining member profile information for a control set of one or more control members, wherein each control member in the control set is at least believed to be legitimate;
    obtaining member profile information for a fraudulent set of one or more fraudulent members, wherein each fraudulent member in the fraudulent set is at least suspected of being fraudulent; and
    using a processor to generate a test using (1) the member profile information for the control set and (2) the member profile information for the fraudulent set, wherein:
    (1) the test inputs one or more pieces of member profile information from a member profile being tested and (2) the test generates a fraud score associated with a degree to which the member profile being tested is believed to be a fraudulent representation of a member associated with the member profile being tested.

2. The method of claim 1, wherein:
    the test is generated without taking into consideration interaction between members; and
    the test does not take as input interaction between members.

3. The method of claim 1, wherein generating the test includes:
    determining, for a first category of member profile information, a first weight associated with the predictiveness of the first category of member profile information in predicting a fraudulent member; and
    determining, for a second category of member profile information, a second weight associated with the predictiveness of the second category of member profile information in predicting a fraudulent member.

4. A system for generating a test, comprising:
    a processor; and
    a memory coupled with the processor, wherein the memory is configured to provide the processor with instructions which when executed cause the processor to:
        obtain member profile information for a control set of one or more control members, wherein each control member in the control set is at least believed to be legitimate;

obtain member profile information for a fraudulent set of one or more fraudulent members, wherein each fraudulent member in the fraudulent set is at least suspected of being fraudulent; and generate a test using (1) the member profile information for the control set and (2) the member profile information for the fraudulent set, wherein: (1) the test inputs one or more pieces of member profile information from a member profile being tested and (2) the test generates a fraud score associated with a degree to which the member profile being tested is believed to be a fraudulent representation of a member associated with the member profile being tested.

5. The system of claim 4, wherein:

the test is generated without taking into consideration interaction between members; and the test does not take as input interaction between members.

6. The system of claim 4, wherein the instructions for generating the test include instructions for:

determining, for a first category of member profile information, a first weight associated with the predictiveness of the first category of member profile information in predicting a fraudulent member; and determining, for a second category of member profile information, a second weight associated with the predictiveness of the second category of member profile information in predicting a fraudulent member.

7. A computer program product for generating a test, the computer program product being embodied in a tangible, non-transitory computer readable storage medium and comprising computer instructions for:

obtaining member profile information for a control set of one or more control members, wherein each control member in the control set is at least believed to be legitimate;

obtaining member profile information for a fraudulent set of one or more fraudulent members, wherein each fraudulent member in the fraudulent set is at least suspected of being fraudulent; and generating a test using (1) the member profile information for the control set and (2) the member profile information for the fraudulent set, wherein: (1) the test inputs one or more pieces of member profile information from a member profile being tested and (2) the test generates a fraud score associated with a degree to which the member profile being tested is believed to be a fraudulent representation of a member associated with the member profile being tested.

8. The computer program product of claim 7, wherein:

the test is generated without taking into consideration interaction between members; and the test does not take as input interaction between members.

9. The computer program product of claim 7, wherein the computer instructions for generating the test include computer instructions for:

determining, for a first category of member profile information, a first weight associated with the predictiveness of the first category of member profile information in predicting a fraudulent member; and determining, for a second category of member profile information, a second weight associated with the predictiveness of the second category of member profile information in predicting a fraudulent member.

10. The method of claim 1 further comprising:

generating a fraud score for a member profile being tested, including by having the test input one or more pieces of member profile information from the member profile being tested; and determining, based at least in part on the fraud score, if the member profile being tested is believed to be a fraudulent representation of the member associated with the member profile being tested.

11. The system of claim 4, wherein the memory is further configured to provide the processor with instructions which when executed cause the processor to:

generate a fraud score for a member profile being tested, including by having the test input one or more pieces of member profile information from the member profile being tested; and determine, based at least in part on the fraud score, if the member profile being tested is believed to be a fraudulent representation of the member associated with the member profile being tested.

12. The computer program product of claim 7 further comprising computer instructions for:

generating a fraud score for a member profile being tested, including by having the test input one or more pieces of member profile information from the member profile being tested; and determining, based at least in part on the fraud score, if the member profile being tested is believed to be a fraudulent representation of the member associated with the member profile being tested.

13. The method of claim 10, wherein:

the one or more pieces of member profile information input by the test include(s) marital status; and generating the fraud score includes generating a larger fraud score for a widowed marital status than for a non-widowed martial status, including one or more of the following: divorced or never married.

14. The system of claim 11, wherein:

the one or more pieces of member profile information input by the test include(s) marital status; and the instructions for generating the fraud score include instructions for generating a larger fraud score for a widowed marital status than for a non-widowed martial status, including one or more of the following: divorced or never married.

15. The computer program product of claim 12, wherein:

the one or more pieces of member profile information input by the test include(s) marital status; and the computer instructions for generating the fraud score include computer instructions for generating a larger fraud score for a widowed marital status than for a non-widowed martial status, including one or more of the following: divorced or never married.

16. The method of claim 10, wherein:

the one or more pieces of member profile information input by the test include(s) level of education; and generating the fraud score includes generating a larger fraud score for a graduate degree than for a level of education below a graduate degree, including one or more of the following: an undergraduate degree, some undergraduate work, a high school degree, or some high school.

17. The system of claim 11, wherein:

the one or more pieces of member profile information input by the test include(s) marital status; and the instructions for generating the fraud score include instructions for generating a larger fraud score for a graduate degree than for a level of education below a graduate degree, including one or more of the following: an undergraduate degree, some undergraduate work, a high school degree, or some high school.

18. The computer program product of claim 12, wherein:

the one or more pieces of member profile information input by the test include(s) marital status; and the computer instructions for generating the fraud score include computer instructions for generating a larger fraud score for a graduate degree than for a level of education below a graduate degree, including one or more of the following: an undergraduate degree, some undergraduate work, a high school degree, or some high school.

19. The method of claim 10, wherein:

the one or more pieces of member profile information input by the test include(s) a match distance associated with a maximum desired distance between a member being matched and a match; and generating the fraud score includes generating a larger fraud score for a match distance that permits matches outside of a metropolitan area than for a match distance limited to a metropolitan area.

20. The system of claim 11, wherein:

the one or more pieces of member profile information input by the test include(s) a match distance associated with a maximum desired distance between a member being matched and a match; and the instructions for generating the fraud score include instructions for generating a larger fraud score for a match distance that permits matches outside of a metropolitan area than for a match distance limited to a metropolitan area.

21. The computer program product of claim 12, wherein:

the one or more pieces of member profile information input by the test include(s) a match distance associated with a maximum desired distance between a member being matched and a match; and the computer instructions for generating the fraud score include computer instructions for generating a larger fraud score for a match distance that permits matches outside of a metropolitan area than for a match distance limited to a metropolitan area.

* * * * *

UNITED STATES PATENT AND TRADEMARK OFFICE
CERTIFICATE OF CORRECTION

PATENT NO. : 8,595,801 B2
APPLICATION NO. : 13/543001
DATED : November 26, 2013
INVENTOR(S) : Buckwalter et al.

Page 1 of 1

It is certified that error appears in the above-identified patent and that said Letters Patent is hereby corrected as shown below:

In the claims

In column 12, line 35, claim 13, delete "martial" and insert --marital--, therefor.

In column 12, line 42, claim 14, after "non-widowed", delete "martial" and insert --marital--, therefor.

In column 12, line 51, claim 15, delete "martial" and insert --marital--, therefor.

Signed and Sealed this
Fourteenth Day of June, 2016

Michelle K. Lee
*Director of the United States Patent and Trademark Office*